June 23, 1936.  V. E. SCHMIEDEKNECHT  2,044,816
FLOAT VALVE
Filed Oct. 25, 1933    2 Sheets-Sheet 2
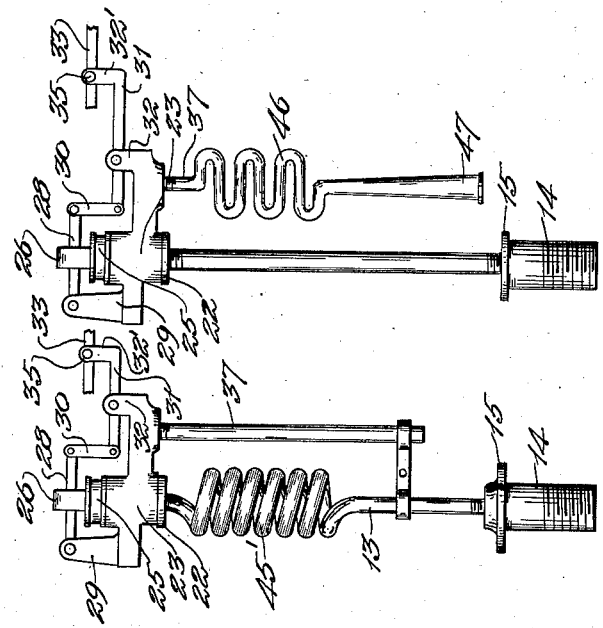
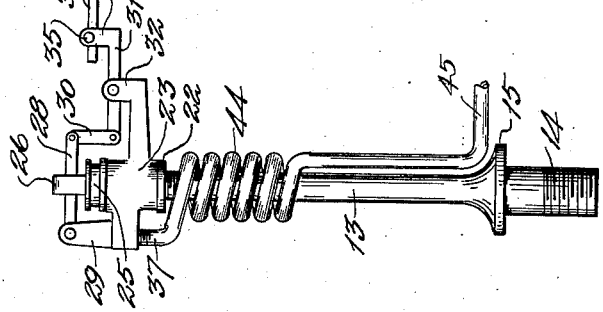
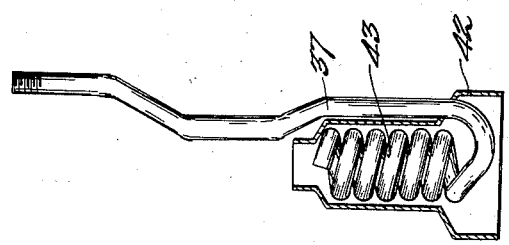
Inventor
V. E. Schmiedeknecht,
By J. Clarkson
Attorney Patented June 23, 1936

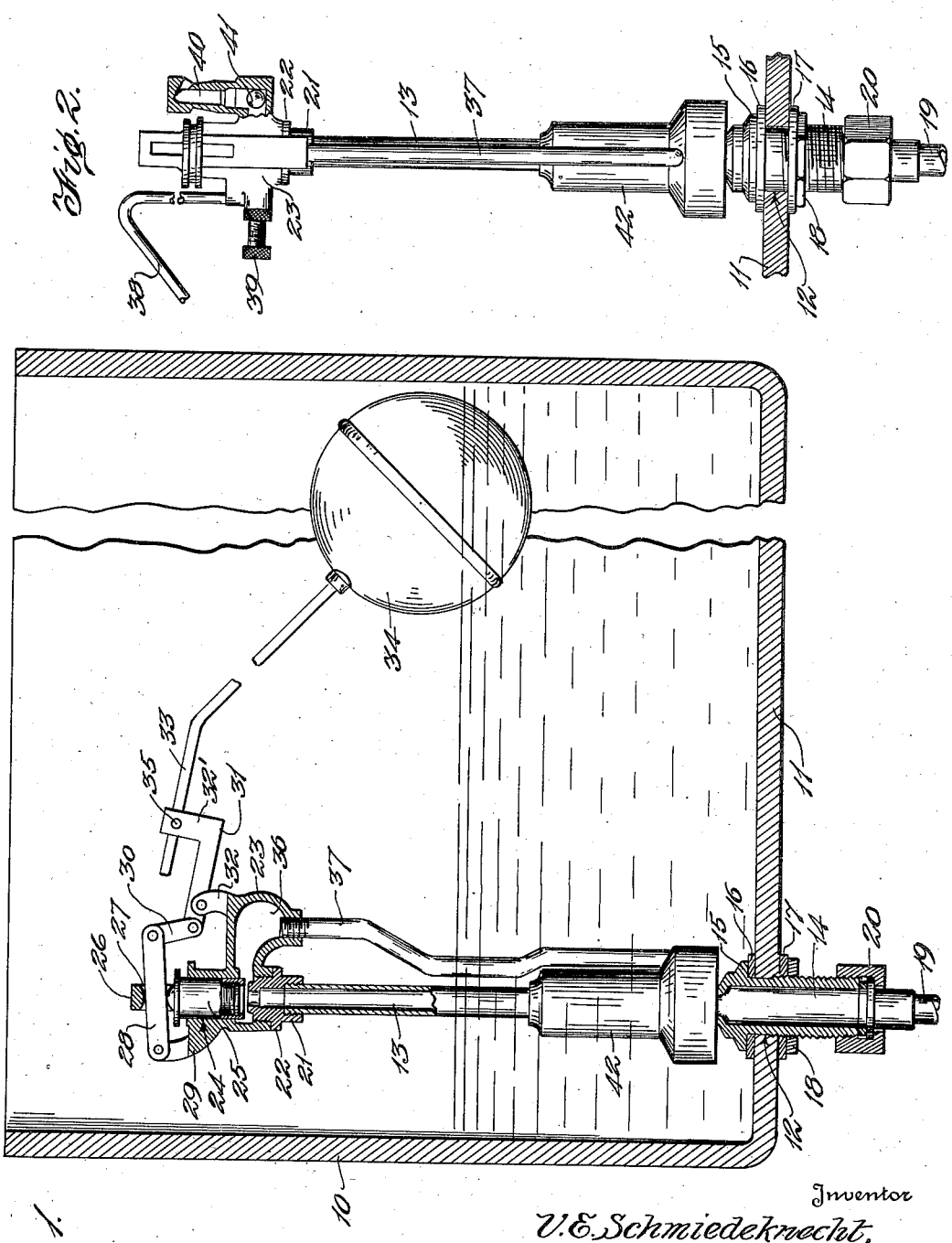

2,044,816

UNITED STATES PATENT OFFICE 2,044,816

FLOAT VALVE

Victor E. Schmiedeknecht, Louisville, Ky.

Application October 25, 1933, Serial No. 695,182

4 Claims. (Cl. 137—104)

This invention relates to flushing tanks such as are used in connection with water closets and has special reference to a float controlled valve and filling pipe for such tanks.

In the usual form of such devices the water flows through the valve and out of the filling or supply pipe at a high velocity, causing very objectionable noises among which are the noises due to the running water, noises caused by the vibration of the parts of the valve, especially the chattering which is apt to occur when the valve is nearly closed and the noises due to the closing or seating of the valve due to the velocity of the water passing between the valve and seat, especially noticeable when the valve is nearly closed.

One important object of the invention is to provide a novel construction of valve and supply pipe wherein water flowing through the valve and pipe will have its velocity so retarded as to issue from the pipe in so noiseless a manner as to be practically inaudible.

A second important object of the invention is to provide a novel construction of such devices so arranged as to cause the water to flow through the device in a uniform manner free from alternate velocity variations tending to produce vibrations in the structure.

A third important object of the invention is to provide a novel construction of such devices wherein the flow of water between the valve proper and its seat will be at such uniform velocity and constant pressure that no vibration or chattering will be produced in the valve proper, and thus the vibrations be communicated to the adjacent parts.

A fourth important object of the invention is to provide a novel form of such device which may be cheaply manufactured, is of simple construction and is not readily affected by variations in manufacture or such variations as arise from wear under use.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a vertical longitudinal section through a flushing tank equipped with this invention and showing the invention partly in section and partly in elevation.

Figure 2 is a vertical view partly in section and taken at right angles to Figure 1 with the float and valve operating linkage omitted.

Figure 3 is a vertical detail section on the median plane of the lower part of Figure 2.

Figure 4 is an elevation showing one modification of the device.

Figure 5 is a similar view showing a second modification of the device.

Figure 6 is a similar view showing a third modification of the device.

In the embodiments of the invention herein disclosed, there is illustrated a tank or reservoir 10 having a bottom 11 provided adjacent one end of the tank with an opening 12. A riser stem or tube 13 has an enlarged lower end 14 which is externally threaded and passes down through the opening 12. A collar 15 is provided on the upper end of this enlarged portion and between this collar and the bottom 11 is positioned a packing washer 16 of any suitable packing material. A second packing washer 17 fits on the end 14 below the bottom and is forced thereagainst by a nut 18 which also effects compression of the washer 16 against the bottom 11 by the collar 15. Thus a water-tight fitting is provided for the riser stem and the stem is held rigidly in position. A supply pipe 19 is connected to the lower end of the riser stem by an ordinary union 20.

Screwed onto the upper end of the stem 13 is a tubular valve seat member 21 having a collar 22 intermediate its upper and lower ends. Screwed onto this upper end is a valve casing 23. This valve casing is provided with a cylindrical bore 24 above and aligned with the member 21 and slidably mounted in this bore is a vertically reciprocable valve 25 having a washer at its lower end seating on the seat member 21 to form a water-tight closure for the upper end of the stem. A valve stem 26 rises from the upper end of this valve 25 and is provided with a transverse slot 27 wherethrough extends a lever 28 having its rear end pivoted to a bracket 29 formed on the valve casing 23. The other end of the lever 28 is connected by a depending link 30 with the rear end of a lever 31 which is pivoted intermediate its ends to a bracket 32 formed on the valve casing 23. The forward end of the lever 31 is provided with an upstanding arm 32' provided with a suitable opening to receive the stem or shank 33 of a float 34 of the usual form. A set screw 35 serves to hold the shank 33 properly secured to the lever 31. By means of this arrangement when the bowl of the closet is flushed by allowing the water to flow from the tank by means of a flushing valve (not shown), the ball 34 drops and through the lever system or linkage the valve opens. When the ball rises by water flowing into the tank, upon the flushing valve closing, the ball 34 rises and the linkage operated thereby effects seating or closing of the valve 25.

The valve casing 23 is provided with a chamber 36 into which the valve member 21 opens when the valve 25 is raised. A tank filling tube 37 extends downwardly from the bottom of this chamber. Also a tube 38 leads from this chamber to the water closet for the purpose of ensuring a proper level therein after the flushing operation and the flow of water through this pipe is controlled by a screw valve 39. A relief or vent passage 40, open at its upper end to the air also leads from the chamber 36 and is controlled by an inwardly opening ball valve 41.

For the purposes of this invention the riser stem 13, valve casing 23 and tube 37 will be considered as a tank supply pipe provided with a float controlled valve and having an upflow branch or leg and a down flow branch or leg, there being respectively the stem 13 and tube 37.

In the form shown in Figures 1, 2, and 3 a discharge hood 42 surrounds the lower part of the riser stem 13 and fits tightly thereon at its upper end while the lower end opens freely into the tank adjacent its bottom, surrounding the stem 13 within this hood is a flow retarding and noise eliminating coil 43 to the lower end of which the pipe 37 is connected. The upper end of this coil opens into the upper part of the hood 42.

In the form of the invention shown in Figure 4, the tube 37 is connected to the upper end of a similar coil 44 which has an outflow terminal 45, the coil 44 surrounding the upper part of the stem 13.

In the form of the invention shown in Figure 5 the coil is formed by convolutions 45' in the stem 13 itself.

In the form shown in Figure 6 the coil has its equivalent in the zig-zag bending of the tube 37 at 46 which, for the purposes of this invention may also be termed a coil. In this form the outlet end of the tube 37 is preferably flared as at 47.

In each form, the coil acts as a flow evener since any vibrations due to uneven flow of the water, which is what principally produces the noises, will be absorbed in a noiseless manner by the flexing of the coil convolutions. All forms of these coils may therefore be termed flow eveners.

It will now be observed that the flow evener may be located in either leg of the tank supply pipe and anywhere in the length of said pipe.

When the reservoir tank is empty, the float ball is in its lowest position, hence the plunger of the valve is in the highest position from its seat, allowing the water to flow in full volume through the seat. This water especially when the inlet source of supply is of high pressure would issue from a valve having no silencing device at a high pressure which would cause a decidedly loud roaring noise, objectionable in a bathroom. Furthermore, a violent turbulence is caused by high pressure discharge and often causes the reservoir to run over and result in damage to the surroundings. Again at the point of closure of the valve, that is where the ball float has risen almost to its closed position, a vibration and seat noise often very shrill results due to high pressure on one side of the seat and a gradually lowering exit pressure on the discharge side of the seat.

With the flow evener assembled with the valve, however, the condition of extreme high velocity of the discharge is eliminated. This is accomplished by the fact that the closely coiled passages present frictional surfaces to the stream passing through which results in the reduction of pressure and velocity. Secondly, when in the first form, the discharge takes place through the outlet of the coil it impinges upon the closely fitting hood and a flow takes place in the reverse direction using the outside of the coil as a spiral surface along with the inner surfaces of the hood which further causes a velocity retardation, eliminating the running noise of the stream as it leaves the valve.

It is a well known fact that in any type of valve which controls the passage of a fluid, that the same will close more quietly if the pressures on each side of the seat are more nearly in balance and this principle comes into play in the valve described herewith by the fact that the resistance built up in the coil builds up an internal pressure within same which tends to neutralize the pressure at the valve seat, eliminating the noise and vibration of its closure.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a supply means for flushing tanks, a tank supply pipe having a float controlled valve intermediate its ends, said pipe having an upflow leg and a downflow leg, a pipe coil in said downflow leg, and a downwardly opening hood surrounding the coil into the upper part of which said pipe coil opens, the lower end of the pipe coil receiving water from the downflow leg.

2. In a supply means for flushing tanks, a tank supply pipe having a float controlled valve intermediate its ends, said pipe having an upflow leg and a downflow leg, a pipe coil in said downflow leg and surrounding the upflow leg, and a downwardly opening hood surrounding said pipe coil and having its upper part fitting the upflow pipe tightly above said pipe coil, the downflow leg being connected to the lower end of the pipe coil and the upper end of the pipe coil opening into the upper part of said hood.

3. In a supply means for flushing tanks, a tank supply pipe having a float controlled valve intermediate its ends, said pipe having an upflow leg and a downflow leg, a pipe coil in said downflow leg and surrounding the upflow leg, and a downwardly opening hood surrounding said pipe coil and having its upper part fitting the upflow pipe tightly above said pipe coil, the downflow leg being connected to the lower end of the pipe coil and the upper end of the pipe coil opening into the upper part of said hood, said hood having its lower end of greater diameter than the part surrounding said coil to provide an enlarged outlet for water flowing downwardly from the body of the hood.

4. In a supply means for flushing tanks, a tank supply pipe having a float controlled valve intermediate its ends, said pipe having an upflow leg and a downflow leg between which said valve is located, a pipe coil forming a terminal for said downflow leg, and a hood having a bottom opening and an upper part, said upper part being of substantially the same diameter as the exterior of the pipe coil and into which said pipe coil opens.

VICTOR E. SCHMIEDEKNECHT.